US008548246B2

(12) United States Patent
Al-Omari et al.

(10) Patent No.: US 8,548,246 B2
(45) Date of Patent: *Oct. 1, 2013

(54) METHOD AND SYSTEM FOR PREPROCESSING AN IMAGE FOR OPTICAL CHARACTER RECOGNITION

(75) Inventors: Hussein Khalid Al-Omari, Amman (JO); Mohammad Sulaiman Khorsheed, Riyadh (SA)

(73) Assignee: King Abdulaziz City for Science & Technology (KACST), Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/467,873

(22) Filed: May 9, 2012

(65) Prior Publication Data

US 2012/0219220 A1 Aug. 30, 2012

Related U.S. Application Data

(63) Continuation of application No. 12/814,448, filed on Jun. 12, 2010, now Pat. No. 8,218,875.

(51) Int. Cl.
- *G06K 9/34* (2006.01)
- *G06K 9/18* (2006.01)
- *G06K 9/00* (2006.01)
- *G06K 9/36* (2006.01)
- *H04N 1/04* (2006.01)

(52) U.S. Cl.
USPC ........... 382/185; 382/176; 382/177; 382/178; 382/179; 382/186; 382/187; 382/188; 382/189; 382/276; 358/474

(58) Field of Classification Search
USPC ....................................................... 382/185
See application file for complete search history.

(56) References Cited

U.S. PATENT DOCUMENTS

| | | | |
|---|---|---|---|
| 5,058,182 A * | 10/1991 | Kuan et al. | 382/202 |
| 5,224,179 A | 6/1993 | Denker et al. | |
| 5,410,611 A | 4/1995 | Huttenlocher et al. | |
| 5,613,016 A | 3/1997 | Saitoh | |
| 5,987,170 A * | 11/1999 | Yamamoto et al. | 382/170 |
| 6,304,313 B1 * | 10/2001 | Honma | 355/18 |

(Continued)

OTHER PUBLICATIONS

El-Mahallawy, Mohamaed Saad Mostafa, "A Large Scale HMM-Based Omni Font-Written OCR System for Cursive Scripts", Cairo University, Apr. 2008.

(Continued)

*Primary Examiner* — Michelle Entezari
(74) *Attorney, Agent, or Firm* — Timberline Patent Law Group PLLC

(57) ABSTRACT

A method and system for preprocessing an image, wherein the image includes a plurality of columns, or regions, of text is disclosed. A plurality of components associated with the text is determined. On determining the plurality of components, a line height and a column spacing is determined for the components. The components are then associated with a column based on the line height and the column spacing. A set of characteristic parameters are calculated for each column and the plurality of components of each column are merged based on the characteristic parameters to form sub-words and words. A first plurality of words and/or subwords is merged and processed as a first region and a second plurality of words and/or subwords is merged and processed as a second region wherein at least a portion of the second region vertically overlaps at least a portion of the first region.

24 Claims, 15 Drawing Sheets

(56) References Cited

U.S. PATENT DOCUMENTS

| | | | |
|---|---|---|---|
| 6,683,983 B1 * | 1/2004 | Shen et al. | 382/168 |
| 7,062,090 B2 | 6/2006 | Simmons et al. | |
| 7,298,903 B2 | 11/2007 | Wang et al. | |
| 7,668,394 B2 | 2/2010 | Ahmed | |
| 8,009,928 B1 | 8/2011 | Manmatha et al. | |
| 8,027,539 B2 | 9/2011 | Chen | |
| 8,139,828 B2 * | 3/2012 | Huo et al. | 382/128 |
| 8,218,875 B2 | 7/2012 | Al-Omari et al. | |
| 2004/0096102 A1 | 5/2004 | Handley | |
| 2005/0259866 A1 | 11/2005 | Jacobs et al. | |
| 2007/0122037 A1 * | 5/2007 | Shiiyama | 382/190 |
| 2008/0025610 A1 | 1/2008 | Abdulkader | |
| 2010/0100803 A1 | 4/2010 | Okushiro et al. | |
| 2010/0246963 A1 | 9/2010 | Al-Muhtaseb et al. | |
| 2010/0310115 A1 | 12/2010 | Lin et al. | |
| 2011/0043869 A1 | 2/2011 | Okajo | |
| 2011/0194736 A1 | 8/2011 | Kletter | |
| 2011/0280481 A1 * | 11/2011 | Radakovic et al. | 382/177 |

OTHER PUBLICATIONS

Microsoft Computer Dictionary, Mar. 15, 2002, Microsoft Press.

* cited by examiner

METHOD AND SYSTEM FOR PREPROCESSING AN IMAGE FOR OPTICAL CHARACTER RECOGNITION

CROSS-REFERENCE TO RELATE APPLICATIONS

This is a continuation of, and incorporates by reference in its entirety, U.S. patent application Ser. No. 12/814,448.

FIELD OF THE INVENTION

The invention generally relates to preprocessing an image for Optical Character Recognition (OCR), wherein the image comprises one or more of Arabic text and non-text items. More specifically, the invention relates to preprocessing an image comprising a plurality of columns, wherein each column comprises the one or more of the Arabic text and the non-text items.

BACKGROUND

Automatic conversion of scanned documents into editable and searchable text requires the use of accurate and robust Optical Character Recognition (OCR) systems. OCR systems for English text have reached a high level of accuracy due to various reasons. One of the main reasons is the ability to preprocess English text down to isolated characters to provide as input to the OCR systems. Each character of English text can be isolated because of the non-touching nature of printed English text. However, touching scanned characters present a challenge to the OCR systems and reduce their accuracy when the pitch is variable.

Arabic scanned text includes a series of touching characters and is therefore harder to segment into characters. Another difficulty is that Arabic text may include many dots and accent marks placed above or below the letters to indicate the pronunciation of the letter and the vowel that follows it. This inhibits known preprocessing techniques designed for English from accurately processing Arabic text.

A further characteristic of Arabic text is that the Arabic text can be written with or without the accent marks that indicate the vowels. Additionally, while English text can have either an uppercase representation or a lowercase representation, many Arabic letters include three or four shapes depending on whether the letter is placed at the beginning of a word, at the middle of the word, at the end of the word, or as a standalone letter. Therefore, the various combinations possible with Arabic text due to the accent marks and the location of a letter within a word makes preprocessing Arabic text with present OCR preprocessing systems inaccurate.

In addition, for images having more than one column of Arabic text and non-text items, the Arabic text associated with each column may vary in font size, font style, font color, etc. Due to the varying font size, neighboring columns may not line up and cannot be accurately segmented.

Therefore, there is a need for a method and system to preprocess an image having a plurality of columns, wherein the plurality of columns includes one or more of Arabic text and non-text items.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
FIG. 1 illustrates an exemplary representation of an image including a plurality of columns, wherein the plurality of columns includes one or more of Arabic text and non-text items in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

Before describing in detail embodiments that are in accordance with the invention, it should be observed that the embodiments reside primarily in combinations of method steps and apparatus components related to a method and system for preprocessing an image for OCR. The image includes a plurality of columns, wherein each column includes one or more of Arabic text and non-text items. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional transaction-clients and unique stored program instructions that control the one or more transaction-clients to implement, in conjunction with certain non-transaction-client circuits, some, most, or all of the functions of a method for preprocessing an image for OCR. The image includes a plurality of columns, wherein each column includes one or more of Arabic text and non-text items. The non-transaction-client circuits may include, but are not limited to, a radio receiver, a radio transmitter, signal drivers, clock circuits, power source circuits, and user input devices. As such, these functions may be interpreted as steps of methods for preprocessing an image including Arabic text and non-text items for OCR. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to various embodiments, the invention provides a method and system for preprocessing an image for OCR. The image includes a plurality of columns, wherein each column includes one or more of Arabic text and non-text items. The method includes determining a plurality of components associated with one or more of the Arabic text and the non-text items of the plurality of columns. Here, a component includes a set of connected pixels. Thereafter, a line height and a column spacing associated with the plurality of components are calculated. Subsequently, one or more components of the plurality of components are associated with a column of the plurality of columns based on one or more of the line height and the column spacing. Further, a first set of characteristic parameters associated with each column of the plurality of columns is calculated. The plurality of components associated with each column are then merged based on the first set of characteristic parameters to form one or more of one or more sub-words and one or more words.

FIG. 1 illustrates an exemplary representation of an image including a plurality of columns, wherein each column of the plurality of columns include one or more of Arabic text and non-text items in accordance with various embodiments of the invention. The image may be one of a grayscale image and a color image. Additionally, the image may include salt and pepper noise and may also be skewed. Prior to preprocessing the image for OCR, the salt and pepper noise as well as the skew associated with the image are removed. Also, the image is converted from one of a grayscale image and a color image to a binary image.

Figure 2:
FIG. 2 illustrates an exemplary representation of the image on correcting the skew associated with the image in accordance with an embodiment of the invention.

The skew associated with the image is corrected by determining a baseline associated with the image and orienting the image based on alignment of the baseline. The alignment of the baseline is determined by a modified Hough transform wherein horizontal projections are determined in several directions. The horizontal projections indicate a number of pixels associated with foreground of the image. A reasonable run length corresponding to an approximate word length in Arabic is considered to determine a direction having a highest density of pixels. The direction of the highest density of pixels is considered as the alignment of the baseline. Subsequently, the image is oriented based on the alignment of the baseline. FIG. 2 illustrates an exemplary representation of the image on correcting the skew associated with the image.

On correcting the skew, the salt and pepper noise associated with the image is removed. The salt and pepper noise represents randomly occurring white and black pixels and may include light spots on a dark background or dark spots on a light background. In an embodiment, the salt and pepper noise may be removed by using one or more of a median filter and a majority filter. It will be apparent to a person skilled in the art that the salt and pepper noise may also be removed using one or more noise removal techniques known in the art.

Thereafter, the image is converted to binary from one of a grayscale image and a color image. In an instance when the image is a grayscale image, the image is converted to binary by converting each pixel value between 0 and 255 to either a pixel value 0 or a pixel value 1. In an embodiment, the pixel value 0 represents a background value and the pixel value 1 represents a foreground value. Alternatively, the pixel value 0 may represent the foreground value and the pixel value 1 may represent the background value. The pixel value 0 is associated with a white pixel and the pixel value 1 is associated with a black pixel.

Figure 3:
FIG. 3 illustrates an exemplary representation of the image converted into binary in accordance with an embodiment of the invention.

Before converting a pixel value of a pixel, a threshold value is determined for the grayscale image and accordingly pixel values that lie above the threshold value are converted into a pixel value 1 and pixel values that lie below the threshold value are converted into a pixel value 0. In an embodiment, the threshold value is calculated by creating a histogram of the pixel values of the grayscale image. The histogram represents a frequency of each pixel value. On creating the histogram, a smoothened histogram may be generated by adding frequencies of consecutive pixel values and replacing the consecutive pixel values with a single pixel value having combined frequency of the consecutive pixel values. The number of consecutive pixel values considered may be predefined. Subsequently, the two most dominant peaks of the smoothened histogram are selected and a minimum valley between the two dominant peaks is determined. A pixel value having minimum frequency in the minimum valley is then selected as the threshold value. FIG. 3 exemplarily illustrates the image converted into binary.

In another instance, when the image is a color image, the color image is first converted to a grayscale image and subsequently to binary as described earlier. In an embodiment National Television System Committee (NTSC) default values may be used to convert the color image to a grayscale image.

On converting the image into binary, the number of occurrences of the pixel value 0 and the pixel value 1 is counted. The binary value having a lower count is considered the foreground value and the binary value having a higher count is considered the background value.

Figure 4:
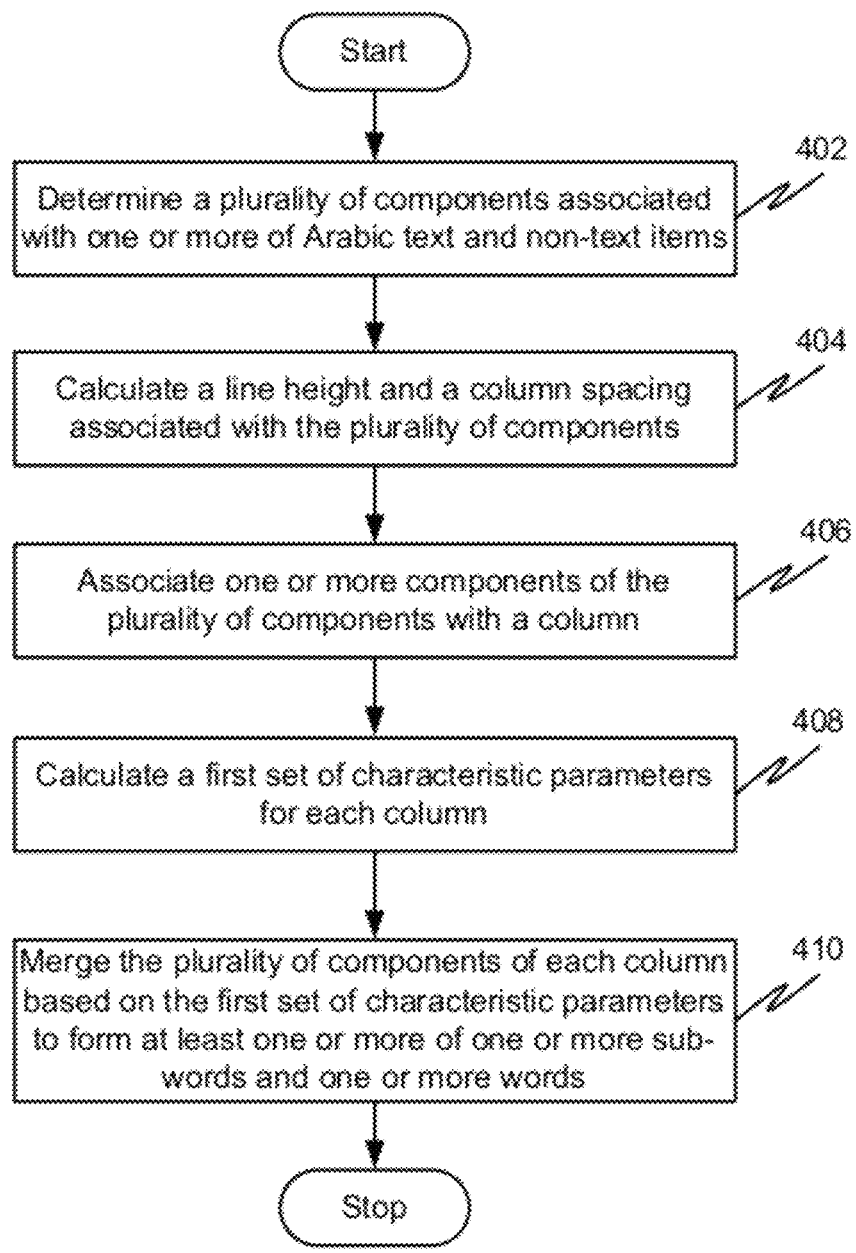
FIG. 4 illustrates a flow diagram of a method of preprocessing an image for optical character recognition in accordance with an embodiment of the invention.

Turning now to FIG. 4, a flow diagram of a method of preprocessing an image for optical character recognition is illustrated in accordance with an embodiment of the invention. The image includes a plurality of columns, wherein each column of the plurality of columns include one or more of Arabic text and non-text items. As described earlier, the image is obtained by performing one or more of converting the image to binary, removing salt and pepper noise, and correcting skew associated with the image. Now, in order to preprocess the image, a plurality of components associated with one or more of the Arabic text and the non-text items in the image are determined at step 402. Here, a component includes a set of connected pixels. A component represents a single character of the Arabic text if that character does not touch any other characters. Accordingly, if more than one character touches each other, then the touching characters are considered as one component. The method of determining the plurality of components is further explained in conjunction with FIG. 5.

On determining the plurality of components, a line height and a column spacing associated with the plurality of components is calculated at step 404. The line height associated with the plurality of components is calculated by creating a histogram of heights corresponding to a height of each of the plurality of components. One or more of the line height and the column spacing is calculated based on an average value of all the components of the plurality of components of the image. For example, the line height is the frequently occurring height averaged over all the components of the plurality of components. The method of calculating the line height is further explained in conjunction with FIG. 6. The column spacing is then dynamically computed as a function of the line height. At step 406, one or more components of the plurality of components are associated with a column of the plurality of columns based on one or more of the line height and the column spacing as exemplarily illustrated in FIG. 7. In other words, the plurality of components are segregated into a plurality of columns based on the line height and the column spacing associated with the plurality of components as exemplarily illustrated by 702, 704, and 706 of FIG. 7. For example, if a spacing between two horizontally consecutive components is less than the column spacing, then the components are considered to be of the same column and accordingly segregated.

Once the plurality of components is associated with a column, a first set of characteristic parameters are calculated for each column at step 408. In an embodiment, the first set of characteristic parameters includes a line height associated with each column, a word spacing associated with each column, a line spacing associated with each column, a number of pixels of each component, a width of each component, a height of each component, coordinates of each component, a density of each component, and an aspect ratio of each component. The method of calculating the line height, the word spacing, and the line spacing is explained in conjunction with FIG. 6, FIG. 8, and FIG. 9 respectively.

Thereafter, at step 410, the plurality of components associated with each column are merged based on the first set of characteristic parameters to form one or more of one or more sub-words and one or more words. The method of merging the plurality of components is further explained in conjunction with FIG. 10.

Figure 5:
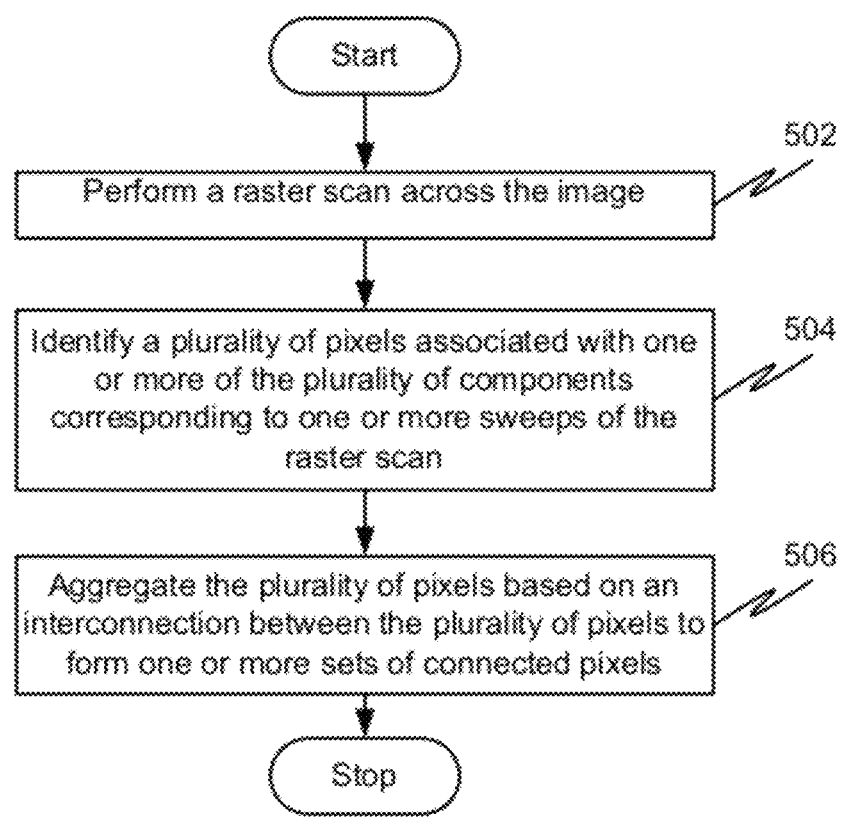
FIG. 5 illustrates a flow diagram of a method of determining a plurality of components in accordance with an embodiment of the invention.

FIG. 5 illustrates a flow diagram of a method of determining a plurality of components in accordance with an embodiment of the invention. At step 502, a raster scan is performed across the image. The raster scan performs a plurality of sweeps, one for each row of pixels corresponding to the plurality of components. In response to performing one or more sweeps of the raster scan, one or more pixels associated with the foreground of the image are identified at step 504. The foreground of the image corresponds to the plurality of components. Subsequently, at step 506, a plurality of pixels is aggregated based on an interconnection between the plurality of pixels to form one or more sets of connected pixels. In an embodiment, the plurality of pixels is considered to be interconnected if they touch one or more of eight neighboring pixels. Thus, consecutive characters in Arabic text form a single component if one or more pixels associated with the consecutive characters are interconnected to each other.

For example, a pixel identified in a current sweep of the raster scan is aggregated with a pixel identified in a previous sweep if the two pixels touch each other. If the pixel identified in the current sweep touches more than one pixel identified in the previous sweep, then the pixel is aggregated with the more than one pixel. In another case, if more than one pixel identified in the current sweep is touching, then the more than one pixel is aggregated. Similarly, one or more pixels identified in subsequent sweeps of the raster scan are also aggregated if the one or more pixels touch each other. The aggregated pixels form a set of connected pixels and are associated with a component of the plurality of components. Accordingly, one or more sets of connected pixels are associated with the plurality of components.

On determining the set of connected pixels, one or more of the number of pixels of each component, the width of each component, the height of each component, the coordinates of each component, the density of each component, and the aspect ratio of each component are calculated by tracking the connected pixels associated with each component.

Figure 6:
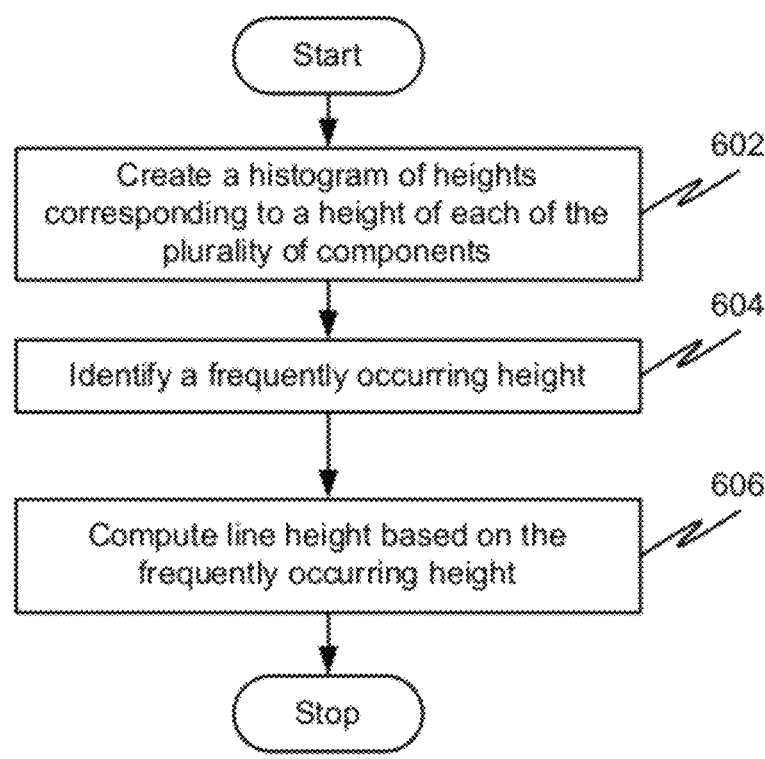
FIG. 6 illustrates a flow diagram of a method of calculating a line height in accordance with an embodiment of the invention.
Figure 7:
FIG. 7 illustrates the image with one or more of the plurality of components associated with a column of a plurality of columns in accordance with an embodiment of the invention.

Turning now to FIG. 6, a flow diagram of a method of calculating a line height is illustrated in accordance with an embodiment of the invention. The method includes creating a histogram of heights corresponding to a height of each of the plurality of components at step 602. The histogram represents the frequency of occurrence of the height of each of the plurality of components. On creating the histogram, a smoothened histogram may be generated by adding the frequencies of consecutive height values and replacing the consecutive height values with a single height value having the combined frequency of the consecutive height values. The number of consecutive height values considered may be predefined. For example, the frequency at height twenty pixels becomes that at height nineteen pixels plus that at height twenty pixels plus that at height twenty one pixels if the number of consecutive height values is defined as three.

Once the smoothened histogram is obtained, a frequently occurring height is identified at step 604. For identifying the frequently occurring height, the heights of small components such as accent marks corresponding to the Arabic text and punctuation marks are excluded. This is done by setting a threshold height and only considering the components having a height greater than the threshold height to identify the frequently occurring height. The frequently occurring height represents the dominant text size of the image if the image has more than one text size.

On identifying the frequently occurring height, the line height is computed based on the frequently occurring height at step 606. The line height is computed as a product of the frequently occurring height and a multiplying factor, wherein the multiplying factor depends on the frequently occurring height. The line height may be used to segment one or more of one or more words and one or more sub-words into one or more horizontal lines of the Arabic text. The line height is used to calculate the word spacing as explained in conjunction with FIG. 8.

Figure 8:
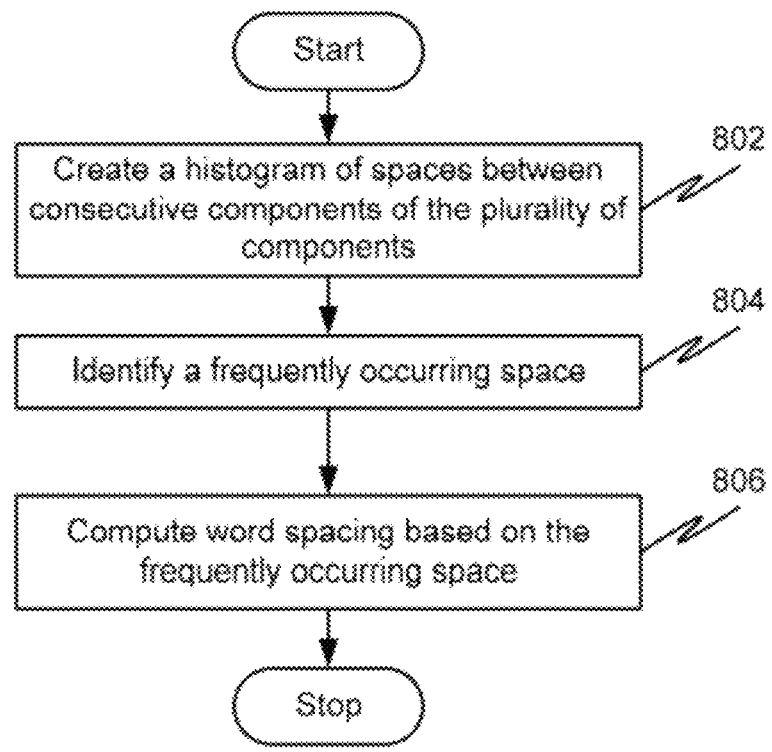
FIG. 8 illustrates a flow diagram of a method of calculating a word spacing in accordance with an embodiment of the invention.

FIG. 8 illustrates a flow diagram of a method of calculating a word spacing in accordance with an embodiment of the invention. The method includes creating a histogram of spaces between consecutive components of the plurality of components at step 802. In an embodiment, any two components that overlap vertically and are not separated by other components are considered to be consecutive components. The two components overlap vertically if the two components share one or more common coordinates along a vertical axis. In other words, the consecutive components belong to a line of the Arabic text. Alternatively, if the two components do not overlap vertically, the two components are considered consecutive components if the two components are separated by a predefined distance.

On creating the histogram of spaces between consecutive components, a smoothened histogram may be generated by adding the frequencies of consecutive space values. The consecutive space values are then replaced by a single space value having the combined frequency of the consecutive space values. For example, the frequency at a space value of ten pixels is replaced by the sum of the frequencies at the space value of nine pixels, the space value of ten pixels, and the space value of eleven pixels.

At step 804, a frequently occurring space from the smoothened histogram is identified. The frequently occurring space is identified from within a threshold range determined by the line height. For example, the frequently occurring space value lying between one fifth the line height and half the line height may be considered. Thereafter at step 806, the word spacing is computed based on the frequently occurring space. The word spacing is the spacing between two consecutive words of the Arabic text.

Figure 9:
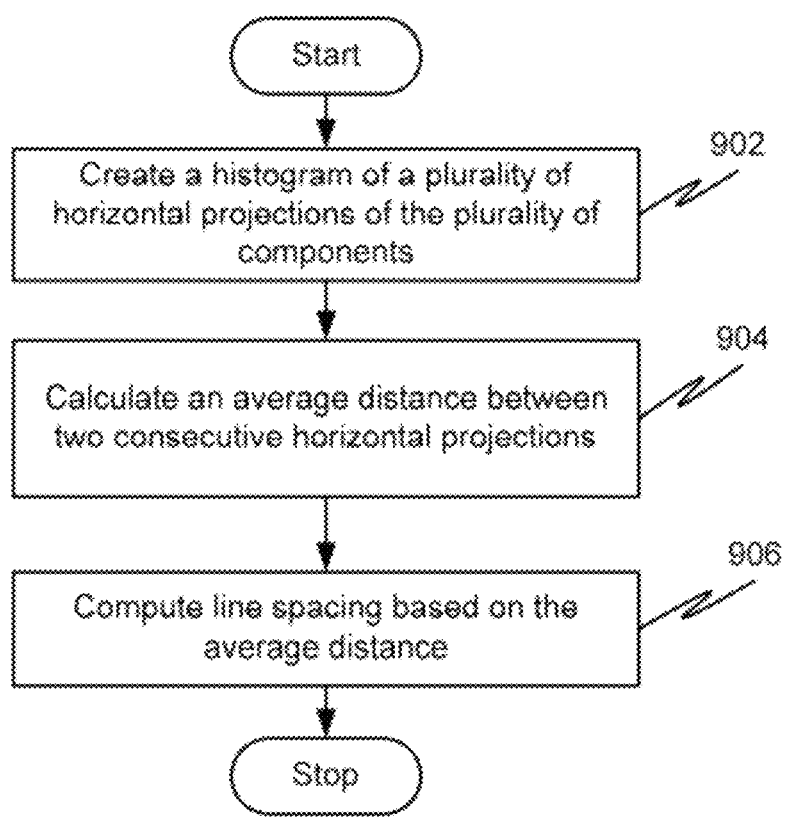
FIG. 9 illustrates a flow diagram of a method of calculating a line spacing in accordance with an embodiment of the invention.

FIG. 9 illustrates a flow diagram of a method of calculating a line spacing in accordance with an embodiment of the invention. At step 902, a histogram of a plurality of horizontal projections of the plurality of components corresponding to the foreground is created. A horizontal projection indicates a number of pixels associated with the plurality of components corresponding to a sweep of the raster scan. For example, if a sweep of the raster scan identifies 15 pixels associated with the plurality of components, then the horizontal projection for the row of pixels corresponding to that sweep is 15.

Thereafter, at step 904, an average distance between two consecutive maximum horizontal projections is calculated. The maximum horizontal projections represent the regions of highest density. Subsequently, at step 906, the line spacing is computed based on the average distance.

Figure 10:
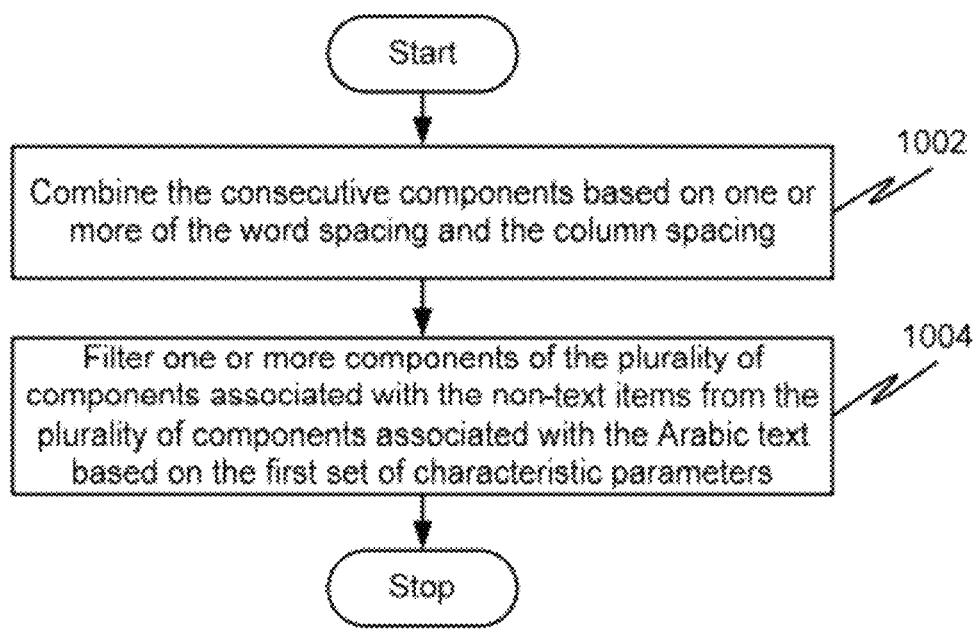
FIG. 10 illustrates a method of merging the plurality of components to form one or more of one or more sub-words and one or more words in accordance with an embodiment of the invention.

On calculating the first set of characteristic parameters, the plurality of components are merged to form one or more of one or more sub-words and one or more words as explained in conjunction with FIG. 10.

FIG. 10 illustrates a method of merging the plurality of components to form one or more of one or more sub-words and one or more words in accordance with an embodiment of the invention. At step 1002, the consecutive components associated with a column are combined if a spacing between the consecutive components is less than a factor of the word spacing. In addition to the word spacing, the coordinates of the consecutive components may also determine if the consecutive components are combined. Combining the consecutive components associated with a column based on one or more of the word spacing and the coordinates of the consecutive components cause different components corresponding to a word or a sub-word of the Arabic text to be combined.

For example, the components associated with the accent marks are combined with the words they belong to based on the word spacing and the position of the components. A word may include one or more components. The position of the components is determined from the coordinates of the components. If one or more of the first set of characteristic parameters associated with a component is similar to an Arabic punctuation or accent mark and is at an appropriate proximity with respect to the components corresponding to the letters of the Arabic text, then the component is grouped along with the letters to form a word or a sub-word. Else, the component is considered as noise and is removed.

In addition to combining the components associated with the Arabic text, the components associated with the non-text items are also combined based on the word spacing. The components associated with the non-text items are combined to form one or more larger components.

At step 1004, the components associated with the non-text items are filtered from the components associated with the Arabic text based on the first set of characteristic parameters. For example, components having a large height, a large width and a small density are removed. These components may correspond to frames or borders around a column or around other non-text items. Similarly, components with a large height, small width, and a high density are recognized as vertical lines and are removed. Horizontal lines are recognized as having small height, large width, and high density.

Figure 11:
FIG. 11 illustrates an exemplary representation of the image with the non-text items removed in accordance with an embodiment of the invention.

Similarly, other non-text items are removed based on one or more filters. The one or more filters use the commonly occurring length of the components, the width of the components, the aspect ratio of the components, the density of the components, and the total number of components of the image to filter the non-text items from the Arabic text. Non-text items that spread over two or more columns are also removed by comparing the dimensions of the components associated with the non-text items with that of the commonly occurring dimensions of the components associated with the Arabic text. FIG. 11 exemplarily illustrates the image with the non-text items removed.

After filtering the non-text items from the Arabic text, a second set of characteristic parameters of the one or more words and one or more sub-words is calculated. The second set of characteristic parameters includes a line height associated with at least one of each sub-word and each word, a word spacing associated with at least one of each sub-word and each word, and a line spacing associated with at least one of each sub-word and each word. The second set of characteristic parameters are calculated in order to further refine the process of combining the plurality of components to form one or more of one or more sub-words and one or more words. Based on the second set of characteristic parameters, one or more sub-words may be grouped to form one or more of one or more sub-words and one or more words.

Figure 12:
FIG. 12 illustrates exemplary segmenting of the one or more words and the one or more sub-words into one or more horizontal lines depending on the line height and the line spacing in accordance with an embodiment of the invention.

Thereafter, the one or more sub-words and the one or more words that overlap vertically and are associated with a column of the plurality of columns are segmented to form a horizontal line of the Arabic text. In an embodiment, the one or more sub-words and the one or more words may also be segmented based on one or more of the line height and the line spacing. For example, if two horizontal lines are segmented together as they have one or more vertically overlapping components with respect to each other, then the two horizontal lines are separated based on one or more of the line height and the line spacing. FIG. 12 illustrates exemplarily segmenting of the one or more words and the one or more sub-words into one or more horizontal lines depending on the line height and the line spacing.

Thus, a method of preprocessing an image for OCR is disclosed. The image includes a plurality of columns, wherein each column includes one or more of Arabic text and non-text items. The method includes determining a plurality of components associated with the Arabic text and the non-text items. A component of the plurality of components represents one or more characters of the Arabic text or one or more of the non-text items. A component represents more than one character if the more than one character is interconnected.

On determining the plurality of components, a line height and a column spacing associated with the plurality of components is calculated. The line height and the column spacing represent an average value of all the components across all the columns. The plurality of components is then segregated into one or more columns based on the averaged line height and the averaged column spacing. Subsequently, a first set of characteristic parameters associated with the plurality of components of each column are calculated. The plurality of components associated with each column are subsequently merged based on the first set of characteristic parameters to form one or more of one or more sub-words and one or more words.

The method disclosed herein enables accurately preprocessing and segmenting Arabic text which includes touching characters and includes a plurality of columns. The method takes into consideration the accent marks and punctuation marks associated with Arabic text when determining if a component is noise or part of the Arabic text. Additionally, the method identifies if the image includes a plurality of columns and segregates them accordingly.

Figure 13:
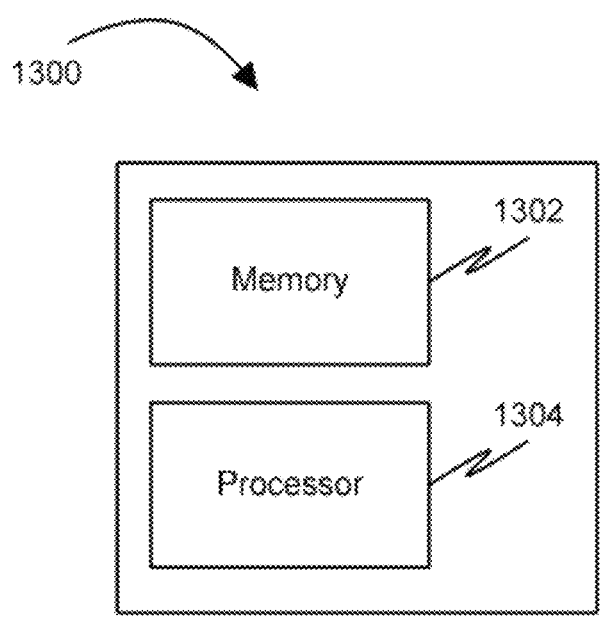
FIG. 13 illustrates a block diagram of a system for preprocessing an image including a plurality of columns, wherein the plurality of columns includes one or more of Arabic text and non-text items in accordance with various embodiments of the invention.

FIG. 13 illustrates a block diagram of a system 1300 for preprocessing an image including one or more of Arabic text and non-text items for Optical Character Recognition (OCR) in accordance with an embodiment of the invention. The image includes a plurality of columns, wherein each column includes one or more of Arabic text and non-text items. The image may be one of a grayscale image and a color image. Additionally, the image may include salt and pepper noise and also may be skewed. As shown in FIG. 13, system 1300 includes a memory 1302 and a processor 1304 coupled to memory 1302. Prior to preprocessing the image for OCR, processor 1304 removes any skew associated with the image using a modified Hough transform as explained in conjunction with FIG. 1. Subsequently, processor 1304 removes the salt and pepper noise and converts the image to binary from one of a grayscale and a color image. In an embodiment, the salt and pepper noise may be removed by using one or more of a median filter and a majority filter. Now, in order to preprocess the image, processor 1304 determines a plurality of components associated with one or more of the Arabic text and the non-text items. A component includes a set of connected pixels. A component represents a single character of the Arabic text if that character does not touch any other characters. Accordingly, if more than one character touches each other, then the touching characters are considered one component.

In an embodiment, in order to determine the plurality of components, processor 1304 performs a raster scan across the image. The raster scan includes performing a plurality of sweeps, one sweep for each row of pixels corresponding to the plurality of components. In response to performing one or more sweeps of the raster scan, one or more pixels associated with the foreground of the image are identified. The foreground of the image corresponds to the plurality of components. Subsequently, processor 1304 aggregates a plurality of pixels based on an interconnection between the plurality of pixels to form one or more sets of connected pixels. The aggregated pixels form a set of connected pixels and are associated with a component of the plurality of components.

The plurality of components thus determined by processor 1304 may be stored in memory 1302 and are used by processor 1304 to calculate a line height and a column spacing associated with the plurality of components. The line height and the column spacing are then used to associate the one or more components of the plurality of components into a column of the plurality of columns. In other words, the plurality of components is segregated into a plurality of columns by processor 1304 if the plurality of components satisfy one or more of the line height and the column spacing. For example, if a spacing between two horizontally or vertically consecutive components is less than the column spacing, then the components are considered to be of the same column and accordingly segregated. Subsequently, a first set of characteristic parameters associated with the plurality of components is calculated. In an embodiment, the first set of characteristic parameters includes a line height associated with each column, a word spacing associated with each column, a line spacing associated with each column, a number of pixels of each component, a width of each component, a height of each component, coordinates of each component, density of each component, and an aspect ratio of each component. Thereafter, processor 1304 merges the plurality of components based on the first set of characteristic parameters. The merged components form one or more of one or more sub-words and one or more words.

In an embodiment, processor 1304 calculates the line height by creating a histogram of heights corresponding to a height of each of the plurality of components. A frequency occurring height from the histogram is then identified by processor 1304. Subsequently, processor 1304 computes the line height as a product of the frequently occurring height and a multiplying factor. The multiplying factor depends on the frequently occurring height. The line height may be used to segment one or more of one or more words and one or more sub-words into one or more horizontal lines of the Arabic text. Additionally, the line height is used by processor 1304 to calculate the word spacing.

Moving on, processor 1304 calculates the word spacing by creating a histogram of spaces between consecutive components of the plurality of components. Processor 1304 then identifies a frequently occurring space from the histogram. The frequently occurring space is identified from within a threshold range, wherein the threshold range is based on the line height. Subsequently, the word spacing is computed based on the frequently occurring space by processor 1304. The word spacing is the spacing between two consecutive words of the Arabic text.

Processor 1304 is also configured to calculate the line spacing by creating a histogram of a plurality of horizontal projections of the plurality of components. A horizontal projection indicates a number of pixels associated with the plurality of components corresponding to each sweep of the raster scan. Then, an average distance between two consecutive horizontal projections is calculated by processor 1304. Subsequently, processor 1304 computes the line spacing based on the average distance.

Further, processor 1304 determines the number of pixels of each component, the width of each component, the height of each component, the coordinates of each component, the density of each component, and the aspect ratio of each component.

As specified earlier, processor 1304 merges the plurality of components associated with each column based on the first set of characteristic parameters. In order to do so, processor 1304 combines the consecutive components if a spacing between the components is less than a factor of the word spacing associated with that column. In addition to the word spacing associated with each column, the coordinates of the consecutive components may also determine if the consecutive components are combined. Further, processor 1304 filters the components associated with the non-text items from the components associated with the Arabic text based on the first set of characteristic parameters as explained in conjunction with FIG. 10. Filtering the non-text items results in one or more of one or more sub-words and one or more words.

Processor 1304 is further configured to calculate a second set of characteristic parameters associated with the one or more of one or more sub-words and one or more words. The second set of characteristic parameters includes a line height associated with one or more of each sub-word and each word, a word spacing associated with one or more of each sub-word and each word, and a line spacing associated with one or more of each sub-word and each word. Two or more sub-words are then grouped by processor 1304 based on the second set of characteristic parameters to form one or more of one or more sub-words and one or more words. In other words, two or more sub-words are grouped together based on the second set of characteristic parameters to form either a complete word or a larger sub-word.

On forming the one or more sub-words and the one or more words, processor 1304 segments the one or more sub-words and the one or more words that overlap vertically and are associated with a column of the plurality of columns to form a horizontal line of the Arabic text. In an embodiment, the one or more sub-words and the one or more words may also be segmented by processor 1304 based on one or more of the line height and the line spacing.

Figure 14:
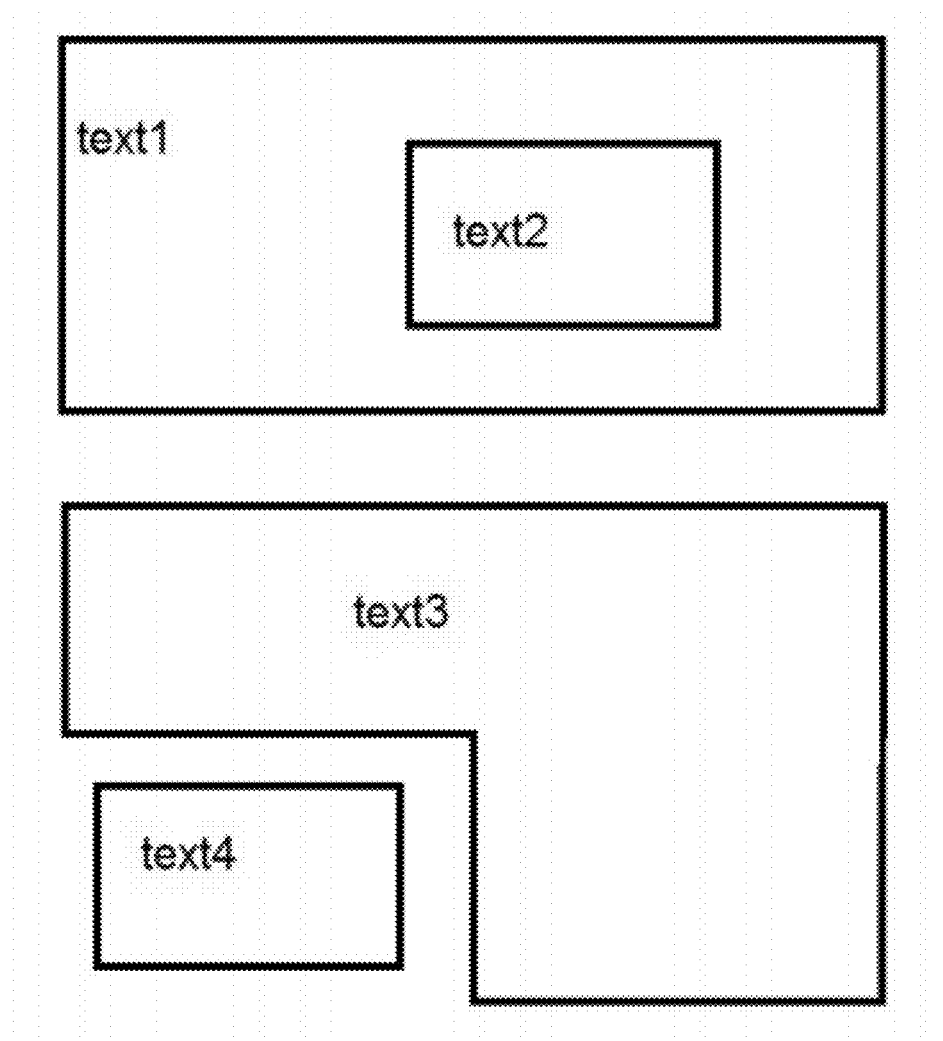
FIG. 14 illustrates a schematic diagram of one or more of a plurality of components associated with a column or region vertically and/or horizontally overlapping another one or more columns or regions in accordance with an embodiment of the invention.
Figure 15:
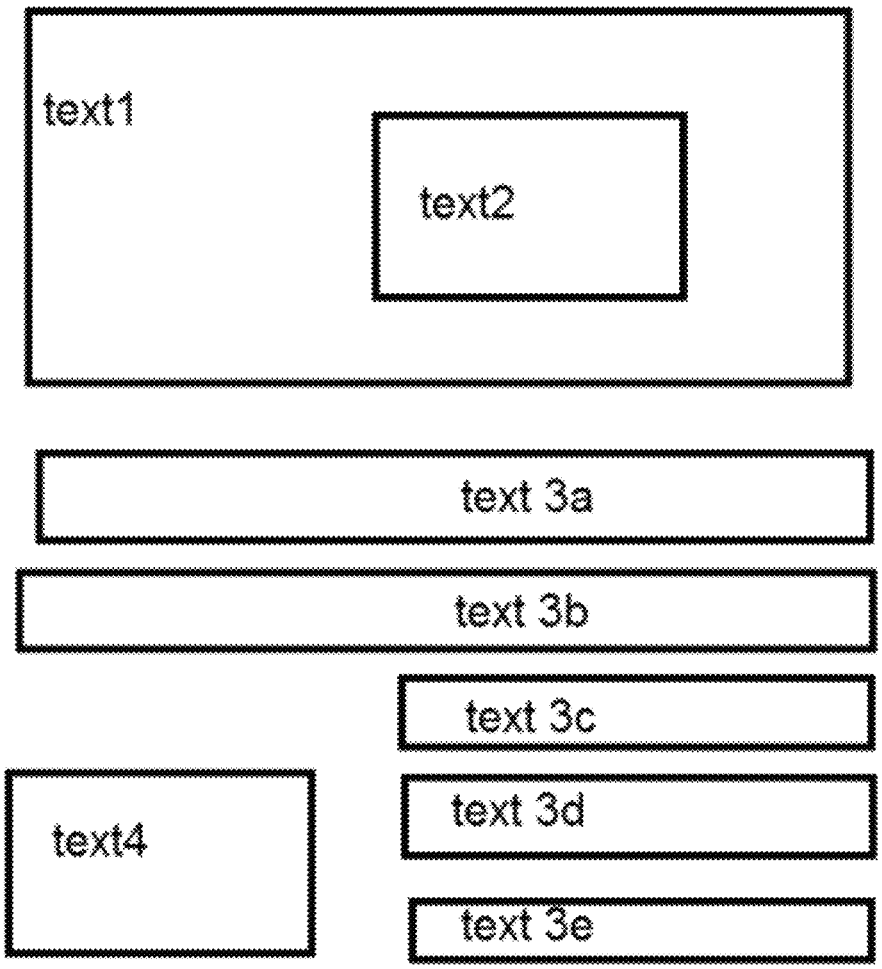
FIG. 15 illustrates a schematic diagram of one or more of a plurality of components associated with a column or region vertically and/or horizontally overlapping another one or more columns or regions in accordance with an embodiment of the invention.

FIGS. 14 and 15 illustrate certain instances in which some of the text columns (or regions) fall within or overlap other columns. For example, one rectangular or circular area of text may fall within a larger rectangular or circular are of text.

FIG. 14 shows one example in which text region "text2" is within text region "text 1" and text region "text3" partially vertically overlaps with "text4." These text regions may have one or more lines, or rows, of text. Similar to the techniques set forth above, the techniques illustrated by example in FIGS. 14 and 15 involve the use of a segmentation and preprocessing engine. A complete raw scanned document with multi columns, text and non-text, possible skew, possible noise, and in grayscale or color is provided to the segmentation and preprocessing engine. In this example, the output of this system is a sequence of sorted columns and a list of line images within each column right side up, non-skewed, noise free, to be passed to the line recognition engine of choice in binary or grayscale formats.

The document is segmented into clean segmented text line images which are oriented properly and clean of noise even though the segmentation and preprocessing engine has no prior information of the page structure or content or the font or the size of the font.

As described above, the grayscale image, whether original or converted from a color image, is converted to a binarized image using dynamic thresholding that varies from page to another. The regions with different backgrounds and/or shading are identified and binarized separately. Each region may be binarized separately for accuracy. As above, foreground/background checking is done on each region, where the foreground of a text page has fewer pixels than the background. The binarization of each region is done using a histogram of the grayscale.

The connected components are calculated from the binary image using single run length algorithms. According to an implementation, the scan goes through the binary image from top left to right, moving down the document. Segments are found on each run length and long segments are disregarded as impurities. This process is repeated for next line and so on, merging segments that touch between lines until all new components are formed, as described above. The new row is checked against the old row; if nothing touches a certain segment or an unfinished component it will be converted into a finished component. The new segments that touch one or more unfinished components are added to them or used to merge more than one unfinished component into one.

The statistical analyses are performed on the connected components using the component parameters such as the one or more dimensions, aspect ratio, density, and perimeter. Rules are added to filter out obvious non-text components.

Statistical analyses are then performed on the remaining text-alike components to find the common height of words or lines of the dominant text size even though the page may have other sizes of text and regions. Statistical analyses are run again on components belonging to each single column to use the new column specific word common height for further text and non-text separation in case different columns have different sizes of text. Word spacing and column spacing are dynamically calculated using this common height. This way, there are no hard coded values and the page calculations are dynamic and do not change if the page has been enlarged or reduced in size. This is achieved using dimensionless parameters that change with size. If a distance calculated is greater than the calculated word spacing and less than the column spacing, the words may be merged.

A distance is calculated based on the word height and column spacing to be used to segregate the components into columns. Since some of the columns may fall within other columns, such as the "text2" region falling within the "text1" region, or an L-shaped column in any direction with text columns underneath or above a horizontal part, such as the "text4" region falling under a portion of the "text3" region, the rectangles defining each column overlap in the horizontal and/or vertical direction. The separation of components into distinct overlapping columns or regions is done by analyzing each component and merging a component with a column if the closest text component to this component falls within that column and the distance is smaller than the margin calculated above. Since merging the component with the closest column would lead to all overlapping columns becoming one major column, merging is done to the column that hosts the closest component to the current component.

FIG. 15 shows an exemplary technique of analyzing one or more components, such as regions "text3*a*"-"text3*e*," which are then merged to be processed as region "text3," as shown in FIG. 14. Columns, such as "text3a"-"text3e," that are layers above one another with similar font sizes and approximate dimensions may be merged into one column or region that has a varying dimension, such as height or width. The columns or regions are sorted based on their location on the page (e.g., their coordinates) to help stream the recognized resulting text in the right order. The postprocessing algorithm may be configured to process the text from the top of the document down and from left to right making use of some wide columns that may span the entire width or height of the page for orientation and visual cues as to how to process the text of the document. The algorithm may also make use of non-text lines or borders to separate columns for processing. Statistical analyses may be further employed to find the average line height. If the line thickness is larger than the average line height by multiple times, the line is split into several lines at the horizontal places of least overlapping between the consecutive lines.

Various embodiments of the invention provide methods and systems for preprocessing an image for OCR. The image includes a plurality of columns, wherein each column includes one or more of Arabic text and non-text items. The invention segments Arabic text into segmented lines of subwords and words that can be accurately processed by an OCR system. The method also takes into consideration the accent marks and punctuation marks associated with Arabic text when determining if a component is noise or part of the Arabic text.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method of preprocessing an image for optical character recognition (OCR), wherein the image comprises a plurality of columns, each column of the plurality of columns comprising text, the method comprising:
   determining a plurality of components associated with the text, wherein a component comprises a series of connected pixels;
   calculating a line height and a column spacing associated with the plurality of components;
   associating at least one component of the plurality of components with a column of the plurality of columns based on at least one of the line height and the column spacing;
   calculating a first set of characteristic parameters for each column of the plurality of columns;
   merging the plurality of components of each column of the plurality of columns based on the first set of characteristic parameters to form at least one of at least one sub-word and at least one word;
   merging a first plurality of words, subwords, or a combination thereof to be processed as a first region;
   merging a second plurality of words, subwords, or a combination thereof to be processed as a second region wherein at least a portion of the second region vertically overlaps at least a portion of the first region;
   wherein calculating a word spacing associated with each column comprises creating a histogram of spaces between consecutive components of the plurality of components associated with each column, identifying a frequently occurring space from the histogram, the frequently occurring space being within a threshold range determined by the line height, and computing the word spacing based on the frequently occurring space; and
   wherein calculating the line spacing associated with each column comprises creating a histogram of a plurality of horizontal projections of the plurality of components associated with each column, a horizontal projection of the plurality of horizontal projections indicating a number of pixels associated with the plurality of components corresponding to each sweep of a raster scan, calculating an average distance between two consecutive maximum horizontal projections, and computing the line spacing based on the average distance.

2. The method of claim 1, wherein the image is obtained by converting at least one of a grayscale image and a color image into a binary image.

3. The method of claim 1, wherein the image is obtained by filtering salt and pepper noise.

4. The method of claim 1, wherein the image is obtained by correcting skew using a modified Hough transform, wherein the modified Hough transform is adapted for the Arabic text.

5. The method of claim 1, wherein determining the plurality of components comprises: performing a raster scan across the image;
   identifying a plurality of pixels associated with at least one of the plurality of components corresponding to at least one sweep of the raster scan; and
   aggregating the plurality of pixels based on an interconnection between the plurality of pixels to form at least one set of connected pixels.

6. The method of claim 5, wherein a pixel is interconnected with at least one of 8 neighboring pixels of the pixel.

7. The method of claim 1, wherein calculating the line height comprises:
   creating a histogram of heights corresponding to a height of each of the plurality of components;
   identifying a frequently occurring height from the histogram of heights; and
   computing the line height based on the frequently occurring height.

8. The method of claim 7, wherein the column spacing is calculated based on the line height.

9. The method of claim 1, wherein calculating the word spacing associated with each column comprises:
   creating a histogram of spaces between consecutive components of the plurality of components associated with each column;
   identifying a frequently occurring space from the histogram, wherein the frequently occurring space is within a threshold range determined by the line height; and
   computing the word spacing based on the frequently occurring space.

10. The method of claim 9, wherein the consecutive components comprise at least one of vertically overlapping components and components separated by a predefined distance, wherein the vertically overlapping components share at least one coordinate along a vertical axis.

11. The method of claim 9, wherein merging the plurality of components comprises:
combining the consecutive components associated with each column based on the word spacing to form at least one of the at least one sub-word and the at least one word; and
filtering at least one component of the plurality of components associated with the non-text items from the plurality of components associated with the Arabic text based on the first set of characteristic parameters.

12. The method of claim 11 further comprising sorting the plurality of columns based on at least one coordinate associated with a column, wherein the at least one coordinate is associated with a position of the column in the image.

13. The method of claim 1 further comprising:
calculating a second set of characteristic parameters associated with the at least one of each sub-word and each word associated with each column, wherein the second set of characteristic parameters is one of a line height associated with at least one of each sub-word and each word, a word spacing associated with at least one of each sub-word and each word, and a line spacing associated with at least one of each sub-word and each word; and
grouping at least two sub-words based on the second set of characteristic parameters to form one of at least one sub-word and at least one word.

14. The method of claim 13 further comprising segmenting the at least one sub-word and the at least one word into at least one horizontal line based on at least one of the line height associated with at least one of each sub-word and each word and the line spacing associated with at least one of each sub-word and each word.

15. A system for preprocessing an image for optical character recognition (OCR), wherein the image comprises a plurality of columns, each column of the plurality of columns comprising at least one of Arabic text and non-text items, the system comprising:
a memory;
a processor coupled to the memory, the processor configured to
determine a plurality of components associated with at least one of the Arabic text and the non-text items of the plurality of columns, a component comprising a series of connected pixels;
calculate a line height and a column spacing associated with the plurality of components;
associate at least one component of the plurality of components with a column of the plurality of columns based on the line height and the column spacing;
calculate a first set of characteristic parameters for each column of the plurality of columns;
merge the plurality of components of each column of the plurality of columns based on the first set of characteristic parameters to form at least one of at least one sub-word and at least one word;
merge a first plurality of words, subwords, or a combination thereof to be processed as a first region;
merge a second plurality of words, subwords, or a combination thereof to be processed as a second region wherein at least a portion of the second region vertically overlaps at least a portion of the first region;
wherein the first set of characteristic parameters comprises one of a line height associated with each column, a word spacing associated with each column, a line spacing associated with each column, a number of pixels corresponding to each component, a width of each component, a height of each component, coordinates of each component, a density of each component, or an aspect ratio of each component; and
wherein for calculating the line spacing associated with each column, the processor:
creates a histogram of a plurality of horizontal projections of the plurality of components associated with each column, a horizontal projection of the plurality of horizontal projections indicating a number of pixels associated with the plurality of components corresponding to each sweep of a raster scan,
calculates an average distance between two consecutive horizontal projections, and
computes the line spacing based on the average distance.

16. The system of claim 15, wherein the processor is further configured to perform at least one of:
converting at least one of a grayscale image and a color image into a binary image;
filtering salt and pepper noise; and
correcting skew using a modified Hough transform.

17. The system of claim 15, wherein for determining the plurality of components the processor is further configured to:
perform a raster scan across the image;
identify a plurality of pixels associated with at least one of the plurality of components corresponding to at least one sweep of the raster scan; and
aggregate the plurality of pixels based on an interconnection between the plurality of pixels to form at least one set of connected pixels.

18. The system of claim 15, wherein for calculating the line height the processor is configured to:
create a histogram of heights corresponding to a height of each of the plurality of components;
identify a frequently occurring height from the histogram of heights; and
compute line height based on the frequently occurring height.

19. The system of claim 18, wherein the processor is further configured to calculate the column spacing based on the line height.

20. The system of claim 15, wherein for calculating the word spacing associated with each column, the processor is configured to:
create a histogram of spaces between consecutive components of the plurality of components associated with each column;
identify a frequently occurring space from the histogram, wherein the frequently occurring space is within a threshold range determined by the line height; and
compute the word spacing based on the frequently occurring space.

21. The system of claim 20, wherein the processor is further configured to:
combine the consecutive components associated with each column based on the word spacing to form at least one of the at least sub-word and the at least one word; and
filter at least one component of the plurality of components associated with the non-text items from the plurality of components associated with the Arabic text based on the first set of characteristic parameters.

22. The system of claim 21, wherein the processor is further configured to sort the plurality of columns based on at least one coordinate associated with a column, wherein the at least one coordinate is associated with a position of the column in the image.

23. The system of claim 15, wherein the processor is further configured to:
- calculate a second set of characteristic parameters associated with the at least one of each sub-word and each word associated with each column, wherein the second set of characteristic parameters is one of a line height associated with at least one of each sub-word and each word, a word spacing associated with at least one of each sub-word and each word, and a line spacing associated with at least one of each sub-word and each word; and
- group at least two sub-words based on the second set of characteristic parameters to form one of at least one sub-word and at least one word.

24. The system of claim 23, wherein the processor is further configured to segment the at least one sub word and the at least one word into at least one horizontal line based on at least one of the line height associated with at least one of each sub-word and each word and the line spacing associated with at least one of each sub-word and each word.

\* \* \* \* \*